United States Patent
Sip

(10) Patent No.: US 9,052,875 B2
(45) Date of Patent: Jun. 9, 2015

(54) ELECTRONIC DEVICE

(71) Applicant: Acer Incorporated, New Taipei (TW)

(72) Inventor: Kim Yeung Sip, New Taipei (TW)

(73) Assignee: Acer Incorporated, New Taipei (TW)

( * ) Notice: Subject to any disclaimer, the term of this patent is extended or adjusted under 35 U.S.C. 154(b) by 280 days.

(21) Appl. No.: 13/802,766

(22) Filed: Mar. 14, 2013

(65) Prior Publication Data

US 2014/0070686 A1      Mar. 13, 2014

(30) Foreign Application Priority Data

Sep. 13, 2012 (TW) ................................ 101133546 A

(51) Int. Cl.
*H05K 7/00* (2006.01)
*G06F 1/16* (2006.01)

(52) U.S. Cl.
CPC ............ *G06F 1/1681* (2013.01); *G06F 1/1616* (2013.01); *G06F 1/1677* (2013.01); *G06F 1/1679* (2013.01)

(58) Field of Classification Search
CPC .............................. G06F 1/1616; G06F 1/1681
USPC .................. 248/117.2, 122.1, 166, 176.3; 361/679.01, 679.02, 679.04, 679.12, 361/679.2, 679.44
See application file for complete search history.

(56) References Cited

U.S. PATENT DOCUMENTS

| 6,925,684 | B2 * | 8/2005 | Kang et al. ....................... 16/264 |
| 7,257,431 | B2 * | 8/2007 | Chen et al. .................. 455/575.3 |
| 8,141,206 | B2 * | 3/2012 | Chen et al. ....................... 16/342 |
| 8,248,764 | B2 * | 8/2012 | Hassemer et al. ........ 361/679.01 |
| 8,369,104 | B2 * | 2/2013 | Kim et al. ...................... 361/814 |
| 2005/0046374 | A1 | 3/2005 | Ogawa et al. |
| 2010/0223756 | A1 | 9/2010 | Chen et al. |
| 2012/0102675 | A1* | 5/2012 | Lee et al. ......................... 16/243 |
| 2012/0188692 | A1 | 7/2012 | Du et al. |

OTHER PUBLICATIONS

"Search Report of Europe Counterpart Application", issued on Sep. 5, 2013, p. 1-p. 4.

* cited by examiner

*Primary Examiner* — Robert J Hoffberg
*Assistant Examiner* — Hung Dang
(74) *Attorney, Agent, or Firm* — Jianq Chyun IP Office

(57) ABSTRACT

An electronic device includes a first body, a second body, a hinge structure and a control unit. The hinge structure includes a first pivot component fixed on the first body, a second pivot component fixed on the second body and pivoted to the first pivot component, a first connecting component fixed on the first pivot component, and a torsion adjusting assembly movably disposed at the second body. The control unit receives a command to control the torsion adjusting assembly to move. When the torsion adjusting assembly is moved to a first position, the first connecting component and the torsion adjusting assembly are separated from each other, and the hinge structure has a first torsion. When the torsion adjusting assembly is moved to a second position, the first connecting component is connected to the torsion adjusting assembly, and the hinge structure has a second torsion larger than the first torsion.

10 Claims, 5 Drawing Sheets

ELECTRONIC DEVICE

CROSS-REFERENCE TO RELATED APPLICATION

This application claims the priority benefit of Taiwan application serial no. 101133546, filed on Sep. 13, 2012. The entirety of the above-mentioned patent application is hereby incorporated by reference herein and made a part of this specification.

BACKGROUND

1. Field of the Invention

The invention is directed to an electronic device, and more particularly, to an electronic device having a hinge structure.

2. Description of Related Art

Benefiting from the advances in semiconductor devices and display technology, electronic apparatuses are unceasingly trending toward increasingly smaller sizes, a plurality of functions and convenient portability. Common portable electronic apparatuses include tablet PCs, smart phones, notebook computers and so forth. Taking the notebook computers for example, a general type notebook computer is composed of a host and a display. The host and the display are pivoted to each other by a hinge structure. In the notebook computer, a user may close the display to the host by the relative rotation of the host and the display for convenient portability. When desiring to use the notebook computer, the user opens the display for convenient operation.

More and more notebook computers are equipped with a touch control display. If torsion of the hinge structure between the display and the host is overly large, the user may not smoothly open the display from the host and even may have to open the display by pressing the host. On the other hand, if the torsion of the hinge structure between the display and the host is overly small, the force of pressing the display usually causes the display to shake when the user operates the display by a touch control manner, which causes the user visual discomfort and operational difficulty.

SUMMARY OF THE INVENTION

The invention provides an electronic device having a hinge structure, and torsion of the hinge structure is adjustable as demanded.

The invention provides an electronic device including a first body, a second body, a hinge structure and a control unit. The hinge structure includes a first pivot component, a second pivot component, a first connecting component and a torsion adjusting assembly. The first pivot component is fixed on the first body. The second pivot component is fixed on the second body and pivoted to the first pivot component. The first connecting component is fixed on the first pivot component. The torsion adjusting assembly is movably disposed at the second body. The control unit is configured to receive a command to control the torsion adjusting assembly to move to a first position or a second position. When the torsion adjusting assembly is moved to the first position, the first connecting component and the torsion adjusting assembly are separated from each other, and the hinge structure has a first torsion. When the torsion adjusting assembly is moved to the second position, the first connecting component is connected to the torsion adjusting assembly, and the hinge structure has a second torsion. The second torsion is larger than the first torsion.

In an embodiment of the invention, the first torsion is between the first pivot component and second pivot component.

In an embodiment of the invention, the torsion adjusting assembly includes a moving component and a second connecting component. The moving component is movably disposed at the second body. The second connecting component is pivoted to the moving component. The second torsion is between the moving component and the second connecting component. When the moving component is moved to the first position, the first connecting component and the second connecting component are separated from each other. When the moving component is moved to the second position, the first connecting component is connected to the second connecting component.

In an embodiment of the invention, the first connecting component and the second connecting component re gears, and when the second connecting component is moved to the second position, the first connecting component is engaged with the second connecting component.

In an embodiment of the invention, the electronic device further includes an actuating unit. The actuating unit includes a coil and a magnetic component. The coil is fixed on the second body. The magnetic component is fixed on the torsion adjusting assembly. The control unit is adapted to control the coil to be energized by the control unit to generate a magnetic field so as to drive the magnetic component to move and drive the torsion adjusting assembly to move to the first position or the second position.

In an embodiment of the invention, the electronic device further includes at least one displacement sensing unit, wherein the displacement sensing unit is coupled to the control unit, and when the displacement sensing unit senses a displacement produced by the first body, the control unit controls the torsion adjusting assembly to be located at the first position.

In an embodiment of the invention, a quantity of the at least one displacement sensing unit is two, the two displacement sensing units are respectively disposed at the first body and the second body, and when the two displacement sensing units sense relative displacements produced by the first body and the second body, the control unit controls the torsion adjusting assembly to be located at the first position.

In an embodiment of the invention, the displacement sensing unit includes at least one of an accelerometer, a magnetometer or a gyroscope.

In an embodiment of the invention, the first body has a touch display panel, the touch display panel is coupled to the control unit, and when the touch display panel receives a touch input signal and the displacement sensing unit senses no displacement produced by the first body, the control unit controls the torsion adjusting assembly to be located at the second position.

In an embodiment of the invention, the first body has a touch display panel, the touch display panel is coupled to the control unit, and when the touch display panel receives a touch input signal and the displacement sensing unit senses a displacement produced by the first body, the control unit controls the torsion adjusting assembly to be located at the first position.

The invention provides an electronic device includes a first body, a second body, a connection board, a first hinge structure, a second hinge structure and a control unit. The first hinge structure is pivoted between the first body and the connection board, the first hinge structure includes a first torsion adjusting assembly. The second hinge structure is pivoted between the second body and the connection board, and the second hinge structure includes a second torsion adjusting assembly. The control unit is configured to receive a command to control the first torsion adjusting assembly and the second torsion adjusting assembly, so that the first hinge structure and the second hinge structure respectively have a first torsion and a second torsion.

In an embodiment of the invention, the first torsion is different from the second torsion.

In an embodiment of the invention, the control unit adjusts the first torsion according to an included angle between the first body and the connection board, and the control unit adjusts the second torsion according to the included angle between the second body and the connection board.

In an embodiment of the invention, when an included angle between the first body and the connection board is smaller than an angle, the second torsion is larger than the first torsion, and when the included angle between the first body and the connection board is larger than the angle, the control unit adjusts the second torsion to be smaller than the first torsion.

In an embodiment of the invention, the second body includes a display screen, the display screen displays a control button, and when the control button is being pressed, the first torsion and the second torsion are reduced via an adjustment of the control unit.

According to foregoing, the electronic device of the invention has the torsion adjusting assembly. The torsion adjusting assembly, with the controls of the control unit, may be moved to the first position so that the first connecting component and the torsion adjusting assembly are separated from each other, or be moved to the second position so that the first connecting component is connected to the torsion adjusting assembly. When the first connecting component and the torsion adjusting assembly are separated from each other, the hinge structure has the smaller first torsion so that the user can smoothly open the first body from the second body or close the first body to the second body. When the first connecting component is connected to the torsion adjusting assembly, the hinge structure has the larger second torsion so as to avoid the first body from being shaken due to touch control operation of the user, and thus, the operation and control of the electronic device may be improved. The user, in process of operating the electronic device, may adjust the torsion of the hinge structure according to a use demand by using the control unit, and thus, a torsion adjustment flexibility and adaptability of the hinge structure may be enhanced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
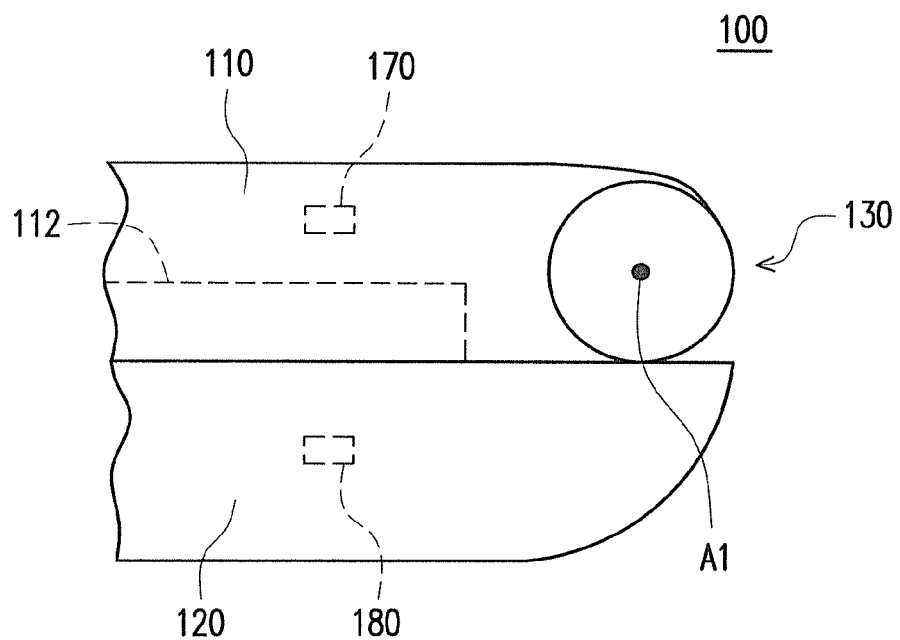
FIG. 1 is a schematic diagram partially illustrating an electronic device according to an embodiment of the invention.
Figure 2A:
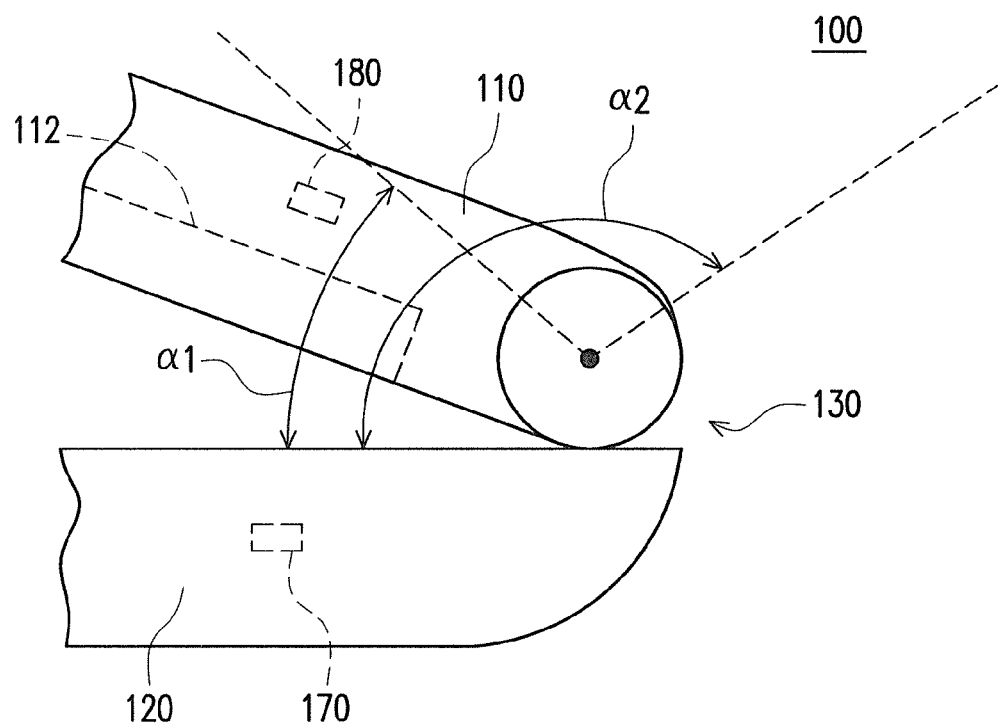
FIG. 2A through FIG. 2C are schematic diagrams illustrating that a first body and a second body depicted in FIG. 1 rotate in relative to each other.
Figure 2B:
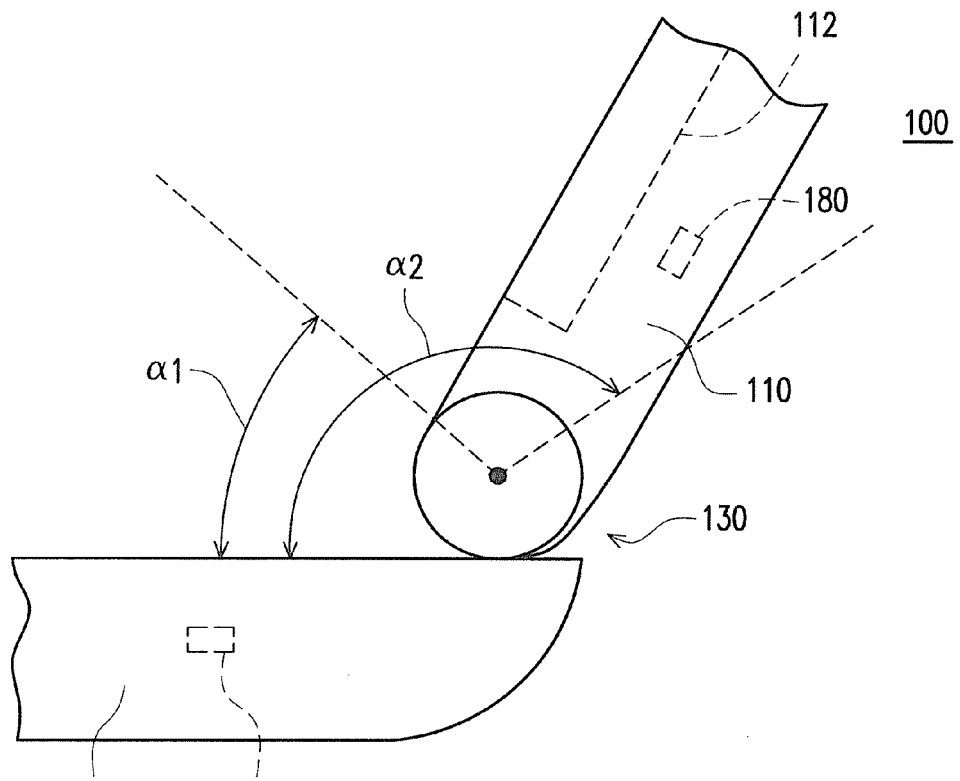
Figure 2C:
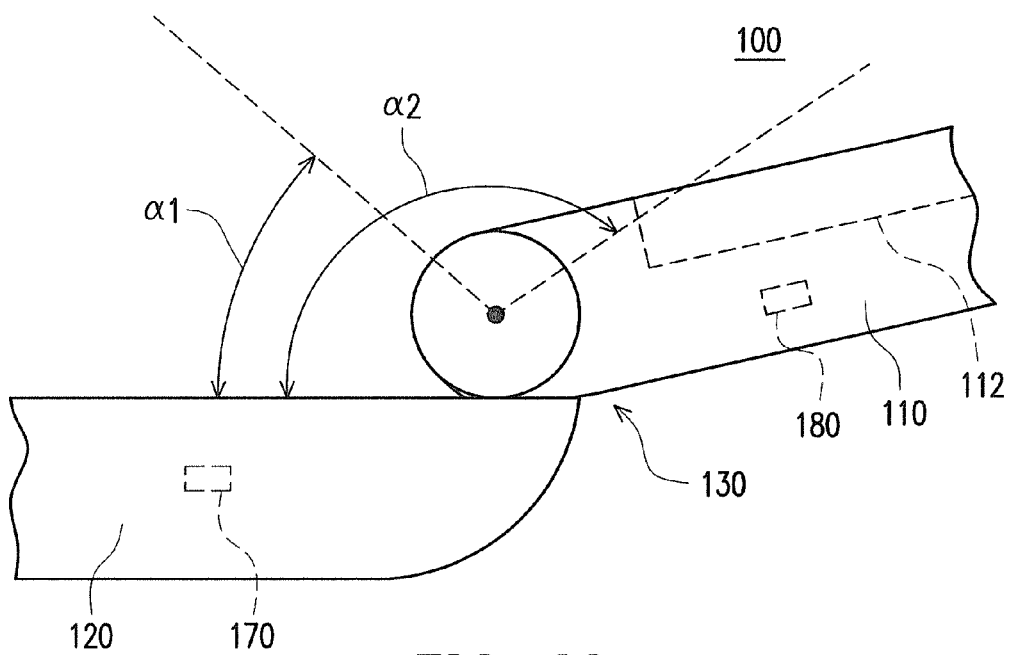
Figure 3:
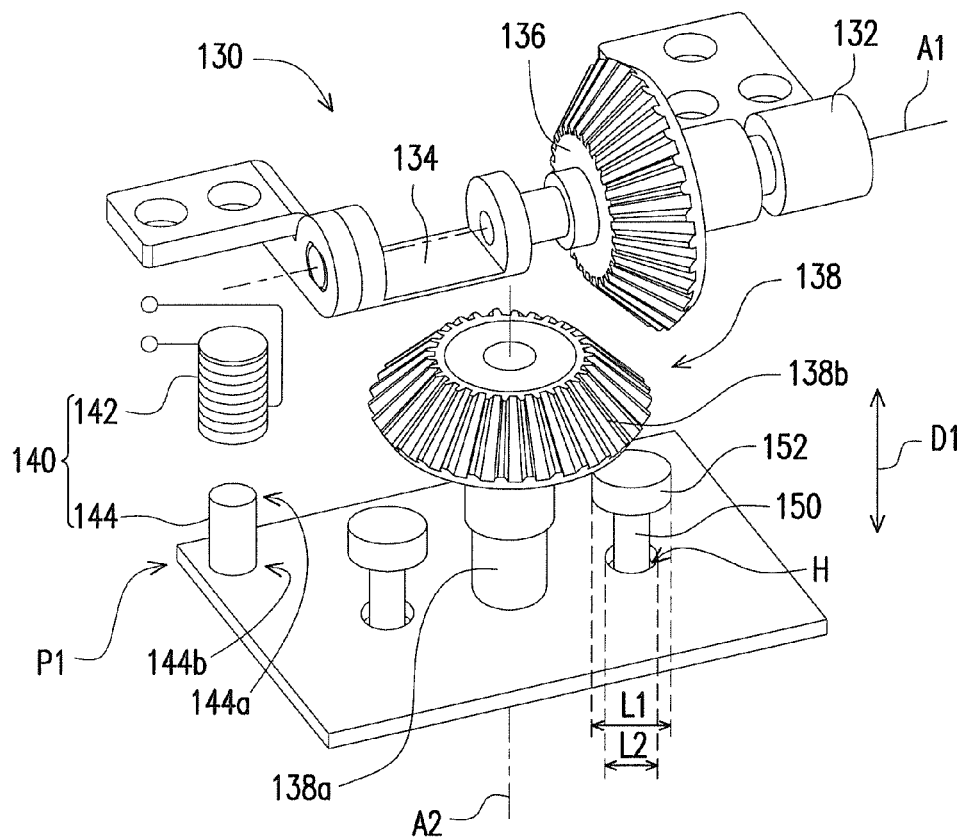
FIG. 3 is a schematic diagram illustrating a hinge structure depicted in FIG. 1.

FIG. 1 is a schematic diagram partially illustrating an electronic device according to an embodiment of the invention. FIG. 2A through FIG. 2C are schematic diagrams illustrating that a first body and a second body depicted in FIG. 1 rotate in relative to each other. FIG. 3 is a schematic diagram illustrating a hinge structure depicted in FIG. 1. Referring to FIG. 1 and FIG. 3, an electronic device 100 of the present embodiment includes a first body 110, a second body 120 and a hinge structure 130. The hinge structure 130 includes a first pivot component 132, a second pivot component 134, a first connecting component 136 and a torsion adjusting assembly 138. The first pivot component 132 is fixed on the first body 110, the second pivot component 134 is fixed on the second body 120, and the second pivot component 134 is pivoted to the first pivot component 132 along an ax axle line A1, such that the first body 110 can be closed to the second body 120, as shown in FIG. 1, or opened from the second body 120, as shown in FIG. 2A through FIG. 2C, by a relative pivot of the first pivot component 132 and the second pivot component 134.

The electronic device 100 of the present embodiment is, for example, a notebook computer, the first body 110 and the second body 120, for example, are respectively a display and a host of the notebook computer, and the first body 110, for example, has a touch display panel 112 for a user to perform a touch operations In other embodiments, the electronic device 100 may be any other adaptive type of device, and the invention is not limited thereto.

Figure 4:
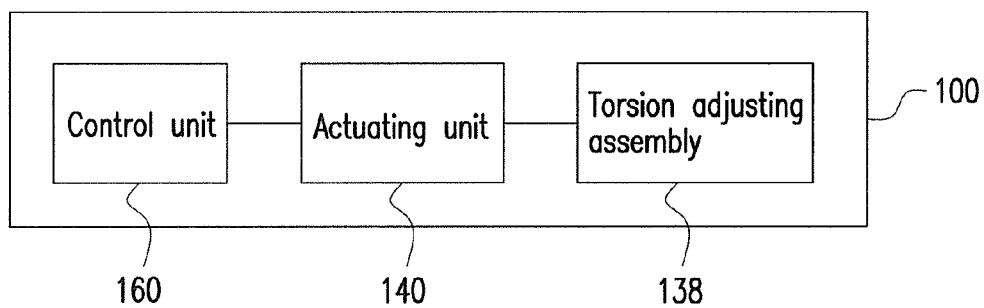
FIG. 4 is a block diagram illustrating a portion of the components of the electronic device depicted in FIG. 1.
Figure 5:
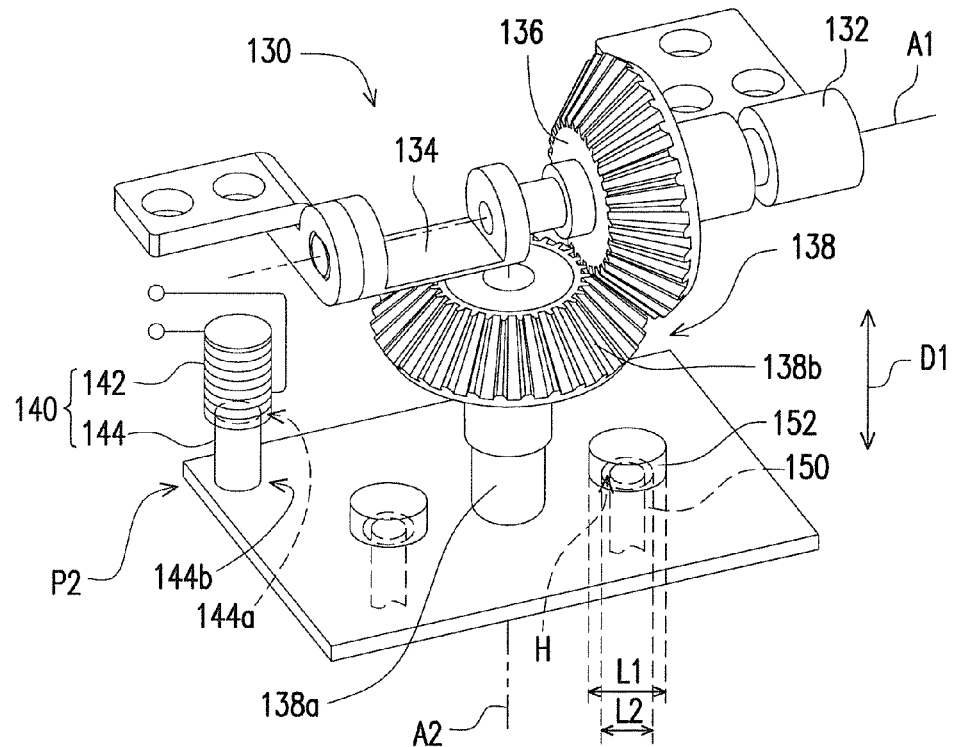
FIG. 5 is a schematic diagram illustrating that the torsion adjusting assembly depicted in FIG. 3 is connected to the first connecting component.

FIG. 4 is a block diagram illustrating a portion of the components of the electronic device depicted in FIG. 1. FIG. 5 is a schematic diagram illustrating that the torsion adjusting assembly depicted in FIG. 3 is connected to the first connecting component. Referring to FIG. 3 through FIG. 5, the first connecting component 136 is fixed on the first pivot component 132, and the torsion adjusting assembly 138 is movably disposed at the second body 120. The electronic device 100 further includes a control unit 160, the control unit 160 is, for example, a control circuit disposed on a motherboard within the second body 120 and configured to received a command to control the torsion adjusting assembly 138 to move to a first position P1 depicted in FIG. 3 or a second position P2 depicted in FIG. 4. When the torsion adjusting assembly 138 is moved to the first position P1, as shown in FIG. 3, the first connecting component 136 and the torsion adjusting assembly 138 are separated from each other so that the hinge structure 130 has a first torsion. When the torsion adjusting assembly 138 is moved to the second position P2, as shown in FIG. 4, the first connecting component 136 is connected to the torsion adjusting assembly 138 so that the hinge structure 130 has a second torsion. The second torsion is greater than the first torsion.

Through the aforementioned configuration, when the first connecting component 136 and the torsion adjusting assembly 138 are separated from each other so that the hinge structure 130 has the smaller first torsion, the user may smoothly open the first body 110 from the second body 120 or close the first body 110 to the second body 120. When the first connecting component 136 is connected to the torsion adjusting assembly 138 so that the hinge structure 130 has the larger second torsion, the first body 110 may be avoided from being shaken due to the touch control operation of the user, and thus, the operation and control of the electronic device 100 may be improved. The user, in process of operating the electronic device 100, may adjust the torsions of the hinge structure 130 according to a use demand by using the control unit 160, and thus, a torsion adjustment flexibility and adaptability of the hinge structure 130 may be enhanced.

In the present embodiment, the user may input a command to the control unit 160 through a user interface displayed by a display surface of the electronic device 100, so as to drive the torsion adjusting assembly 138 to move via the control unit 160. In other embodiments, the user may also input the command to the control unit 160 through a physical button on the body of the electronic device 100, a push button or other adaptive means, so as to drive the torsion adjusting assembly 138 to move via the control unit 160, and the invention is not limited thereto.

For example, when an included angle between the first body 110 and the second body 120, as shown in FIG. 2B, is greater than a first angle $\alpha 1$ and less than a second angle $\alpha 2$, it is suitable for the user, at this moment, to perform the touch control operation on the touch display panel 112 of the first body 110. The user may move the torsion adjusting assembly 138 to the second position P2 depicted in FIG. 5 via the control unit 160, so that the hinge structure 130 has the larger second torsion to avoid the first body 110 from being shaken due to the touch control operation. When an included angle between the first body 110 and the second body 120 is small than the first angle $\alpha 1$ (as shown in FIG. 2A) or greater than the second angle $\alpha 2$ (as shown in FIG. 2C), the user may moves the torsion adjusting assembly 139 to the first position P1 depicted in FIG. 3 via the control unit 160, so that the hinge structure 130 has the smaller first torsion and the user can drive the first body 110 to rotate in relative to second body 120 with less effort. In the present embodiment, the first angle $\alpha 1$ is, for example, 45 degrees and the second angle $\alpha 2$ is, for example, 135 degrees, but the invention is not limited thereto. The first angle $\alpha 1$ and the second angle $\alpha 2$ may be any other adaptive angles, respectively. In other embodiments, the user may drive the torsion adjusting assembly 138 to adjust the torsions of the hinge structure 130 via the control unit 160 at other adaptive timings, but the invention is not limited thereto. Since the user may self decide a timing for the control unit 160 to drive the torsion adjusting assembly 138, no matter that the first body 110 rotates to the positions depicted in FIG. 2A, FIG. 2B, FIG. 2C or other adaptive position, in relative to the second body 120, the torsions of the hinge structure 130 can be adjusted at anytime depending on the use demand.

In detail, the torsion adjusting assembly 138 of the present embodiment includes a moving component 138a and a second connecting component 138b. The moving component 138a is movably disposed at the second body 120, and the second connecting component is pivoted to the moving component 138a along an axle line A2. The axle line A2 is, for example, perpendicular to the axle line A1. However, in other embodiments, the axle line A2 may not be perpendicular to the axle line A1, and the invention is not limited thereto. When the moving component 138a is moved to the first position P1, as shown in FIG. 3, the first connecting component 136 and the second connecting component 138b are separated from each other. When the moving component 138a is moved to the second position P2, as shown in FIG. 4, the first connecting component 136 is connected to the second connecting component 138b.

In the present embodiment, both the first connecting component 136 and the second connecting component 138b are, for example, gears (illustrated as bevel gears), and the first torsion is between the first pivot component 132 and the second pivot component 134, while the second torsion is between the moving component 138a and the second connecting component 138b. When the first connecting component 136 and the second connecting component 138b of the torsion adjusting assembly 138 are separated from each other, as shown in FIG. 3, the user has to apply a force to resist against the first torsion between the first pivot component 132 and the second pivot component 134, so that the first body 110 is opened from the second body 120 or closed to the second body 120, as shown in FIG. 1 and FIG. 2A through FIG. 2C. When the moving component 138a, as shown in FIG. 5, is moved to the second position P2 to engage the first connecting component 136 and the second connecting component 138b of the torsion adjusting assembly 138 with each other, the user has to apply a greater force to resist against the second torsion between the moving component 138a and the second connecting component 138b, such that the first body 110 can be driven to operate.

In the present embodiment, for example, the second torsion between the moving component 138a and the second connecting component 138b is designed to be larger than the torsion generated when the user performs the touch control operation on the first body 110. Thus, under a situation that the first connecting component 136 and the torsion adjusting assembly 138 are connected with each other, as shown in FIG. 4, the first body 110 may be mitigated or avoided from being shaken when the touch control operation is performed thereon. When the user is to rotate the first body 110 in relative to the second body 12, the second connecting component 138b of the torsion adjusting assembly 138, driven by the control unit 160, may move away from the first connecting component 136, so that the hinge structure 130 has the smaller first torsion, and the user, at this moment, may easily apply a force to resist against the first torsion in order to drive the first body 110 to rotate.

Referring to FIG. 3 and FIG. 5, the electronic device 100 (labeled in FIG. 1) of the present embodiment further includes at least one cylinder 150 (illustrated as two). The cylinder 150 is fixed on second body 120. The moving component 138a has at least one opening H (illustrated as two) and is slidably disposed at the cylinder 150 through the openings H, so that the moving component 138a is adapted to move in relative to the second body 120 along a direction D1. In the present embodiment, the cylinder 150 has a position-limiting part 152, and an outer diameter L1 of the position-limiting part 152 is greater than an aperture L2 of the opening H so as to limit a moving range of the moving component 138a.

The electronic device 100 of the present embodiment further includes an actuating unit 140. The actuating unit 140 is coupled between the control unit 160 and the torsion adjusting assembly 138 (as shown in FIG. 4), and the actuating unit 140 includes a coil 142 and a magnetic component 144. The coil 142 is fixed on the second body 120, the magnetic component 144 is, for example, a magnet and fixed on the torsion adjusting assembly 138. The control unit 160 is adapted to control the coil 142 to be energized to generate a magnetic field so as to drive the magnetic component 144 to move to the first position P1 or the second position P2. For example, an end 144a of the magnetic component 144 is the S pole and the other end 144b of the magnetic component 144 is the N pole. When it is to enable the hinge structure 130 to have the larger second torsion, the user through controlling the control unit 160 may energize the coil 142 to generate a magnetic field. The magnetic field enables the end 144a (the S pole) of the magnetic component 144 to move towards the coil 142 and reach the second position P2, as shown in FIG. 4, so that the second connecting component 138b is engaged with the first connecting component 136. Otherwise, when it is to enable the hinge structure 130 to have the smaller first torsion, the user through controlling the control unit 160 may energize the coil 142 with a reverse current to generate a magnetic field in reverse to the aforementioned magnetic field. The reverse magnetic field enables the end 144a (the S pole) of the magnetic component 144 to move away from the coil 142 and reach the first position P1, as shown in FIG. 3, so that the second connecting component 138b and the first connecting component 136 are separated from each other. In other embodiments, actuating components of other adaptive forms may be utilized to drive the torsion adjusting assembly 138, and the invention is not limited thereto.

When the torsion adjusting assembly 138 is moved to the first position P1 depicted in FIG. 3 or the second position P2 depicted in FIG. 5, the torsion adjusting assembly 138 may be locked by an adaptive hook structure of the second body 120, such that the position of the torsion adjusting assembly 138 is fixed without continuously energizing the coil 142, thereby saving the power of the electronic device 100.

Figure 6:
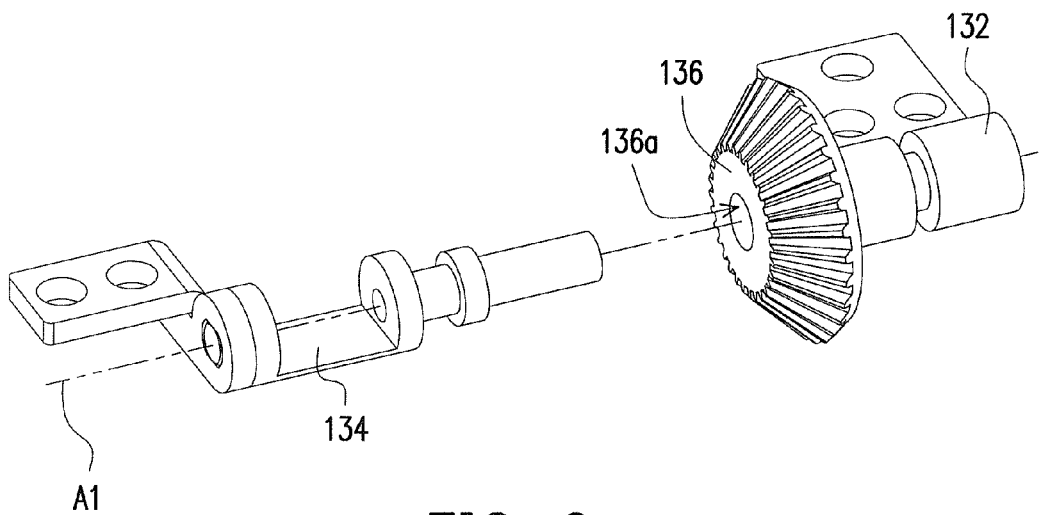
FIG. 6 is an exploded diagram illustrating a portion of the components of the hinge structure depicted in FIG. 3.

FIG. 6 is an exploded diagram illustrating a portion of the components of the hinge structure depicted in FIG. 3. Referring to FIG. 6, in the present embodiment, the first connecting component 136 has a through hole 136a, and the second pivot component 134 passes through the through hole 136a of the first connecting component 136 and is pivoted to the first pivot component 132. In other words, the first connecting component 136 is disposed on the pivot axle line A1 of the hinge structure 130 to save disposition spaces. In other embodiments, the first connecting component 136 may be fixed on other adaptive positions of the first pivot component 132, and the invention is not limited thereto.

In the present embodiment, the control unit 160 may adaptively control the torsions of the hinge structure 130 according to whether a displacement is produced by the first body 110 and whether a touch input signal is received by the touch display panel 112; more details of the present embodiment are explained in the following below.

Referring to FIG. 2B, in the present embodiment, the electronic device 100 further includes a displacement sensing unit 170 and a displacement sensing unit 180. The displacement sensing unit 170 and the displacement sensing unit 180 are respectively disposed at the first body 110 and the second body 120, and are coupled to the control unit 160 depicted in FIG. 4. When the user rotates the first body 110 in relative to the second body 120 and applies a force at the first body 110, the displacement sensing unit 170 and the displacement sensing unit 180 sense relative displacements produced by the first body 110 and the second body 120 due to the force applied by the user, and then the displacement sensing unit 170 and the displacement sensing unit 180 transmit a command to the control unit 160, such that the control unit 160 automatically controls the torsion adjusting assembly 138 to be located at the first position P1 depicted in FIG. 3, so as to separate the torsion adjusting assembly 138 and the first connecting component 136 from each other. After the torsion adjusting assembly 138 and the first connecting component 136 are separated from each other, the hinge structure 130 has the smaller first torsion, so that the user may continue to apply the force at the first body 110 to rotate the first body 110 in relative to the second body 120 without much effort, and thus, the electronic device 100 is avoided from being damaged due to the force forcefully applied by the user under a situation that the hinge structure 130 has the larger torsion. In the aforementioned process, if an initial position of the torsion adjusting assembly 138 is the second position P2, then the torsion adjusting assembly 138 is driven by the control unit 160 to move from the second position P2 to the first position P1, and if the initial position of the torsion adjusting assembly 138 is the first position P1, then the torsion adjusting assembly 138 does not have to be driven by the control unit 160.

The invention does not limit a quantity of the aforementioned displacement sensing unit. Under a situation that the second body 120 immobilized, it is able to determine whether the displacement produced by the first body 110 is relative to the second body 120 with the displacement sensing unit 170 on the first body 110 alone. The displacement sensing unit 170 and the displacement sensing unit 180 may include at least one of an accelerometer, a magnetometer or a gyroscope, but the invention is not limited thereto.

In the present embodiment, the touch display panel 112 of the first body 110 is coupled to the control unit 160. When the user performs touch operations to the touch display panel 112 of the first body 110 to enable the touch display panel 112 to receive the touch input signal, if the displacement sensing unit 170 and the displacement sensing unit 180 sense no displacement produced by the first body 110, then a command transmitted by the touch display panel 112 to the control unit 160 enables the control unit 160 to automatically control the torsion adjusting assembly 138 to be located at the second position P2 depicted in FIG. 5, so that the torsion adjusting assembly 138 and the first connecting component 136 are connected with each other. After torsion adjusting assembly 138 and the first connecting component 136 are connected with each other, the hinge structure 130 has the larger second torsion so as to avoid the first body 110 from being shaken due to the touch operations. In the aforementioned process, if the initial position of the torsion adjusting assembly 138 is the first position P1, then the control unit 160 drives the torsion adjusting assembly 138 to move from the first position P1 to the second position P2, and if the initial position of the torsion adjusting assembly 138 is the second position P2, then the control unit 160 does not have to drive the torsion adjusting assembly 138.

When the user performs the touch operations to the touch display panel 112 of the first body 110 to enable the touch display panel 112 to receive the touch input signal, if the displacement sensing unit 170 and the displacement sensing unit 180 sense a displacement produced by the first body 110, then the displacement sensing unit 170 and the displacement sensing unit 180 transmit a command to the control unit 160, so that the control unit 160 automatically controls the torsion adjusting assembly 138 to be located at the first position P1. In other words, under the situation that the displacement sensing unit 170 and the displacement sensing unit 180 sense the displacement produced by the first body 110, regardless whether the touch display panel 112 receives the touch input signal, the control unit 160 may still adjust the hinge structure 130 to have the smaller first torsion so as to avoid the electronic device 100 from being damaged due to the force forcefully applied by the user under the situation that the hinge structure 130 has the larger torsion.

Figure 7:
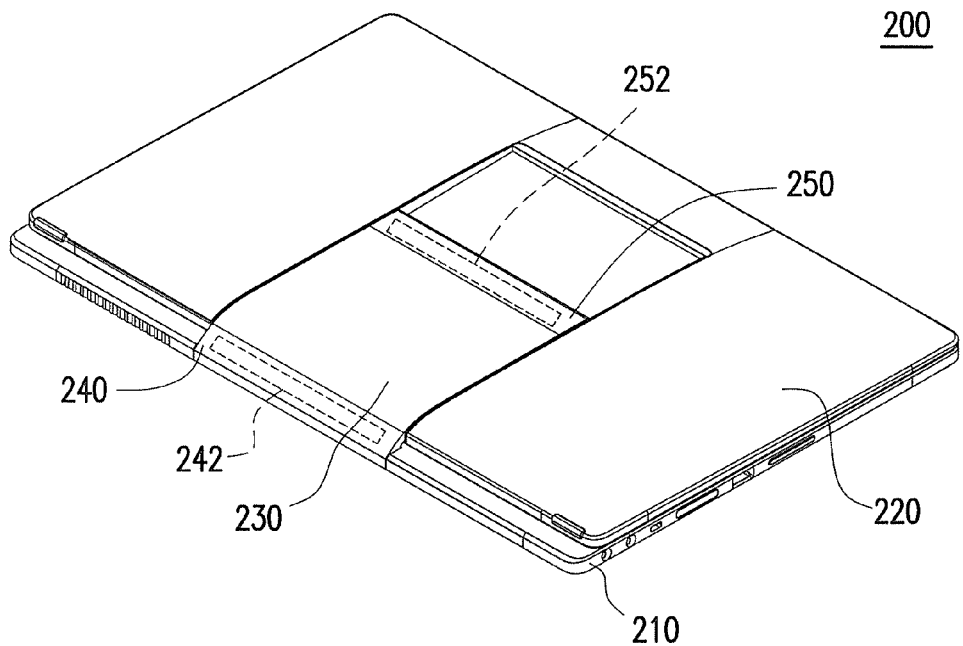
FIG. 7 is a perspective diagram illustrating an electronic device according to another embodiment of the invention.
Figure 8:
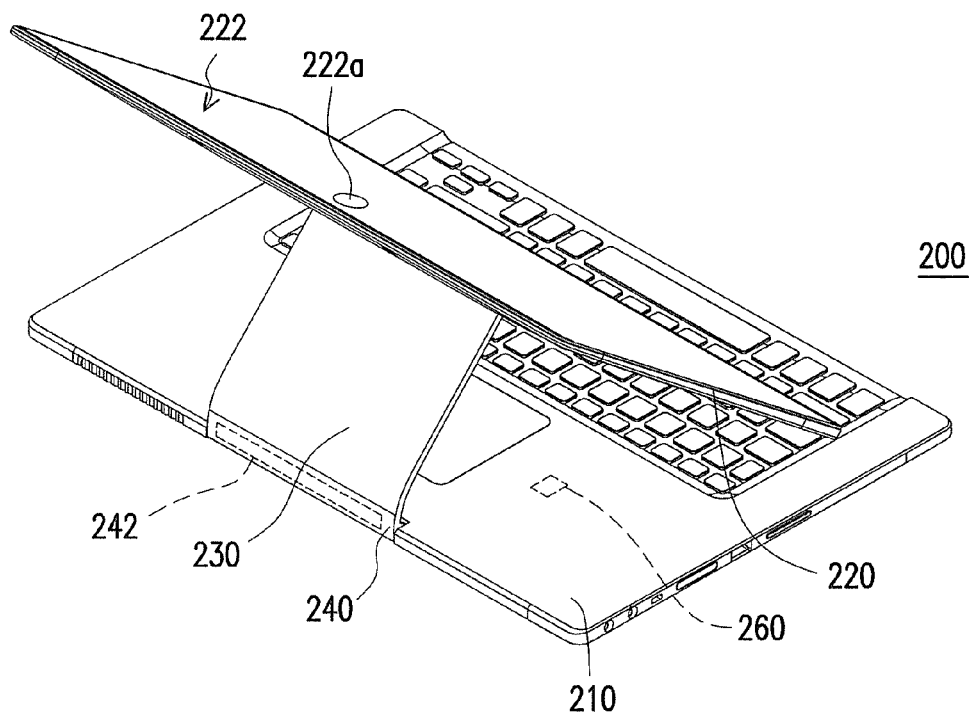
FIG. 8 is a perspective diagram illustrating that a second body and a connection board depicted in FIG. 7 flip-and-turn in relative to a first body.

FIG. 7 is a perspective diagram illustrating an electronic device according to another embodiment of the invention. FIG. 8 is a perspective diagram illustrating that a second body and a connection board depicted in FIG. 7 flip-and-turn in relative to a first body. Referring to FIG. 7 and FIG. 8, an electronic device 200 of the present embodiment includes a first body 210, a second body 220, a connection board 230, a first hinge structure 240, a second hinge structure 250 and a control unit 260. The first hinge structure 240 is pivoted between the first body 210 and the connection board 230, and the second hinge structure 250 is pivoted between the second body 220 and the connection board 230, so that the user can change an angle and a position of the second body 220 relative to the first body 210 via the first hinge structure 240 and the second hinge structure 250.

The first hinge structure 240 includes a first torsion adjusting assembly 242, and the second hinge structure 250 includes a second torsion adjusting assembly 252. The control unit 260 is, for example, a control circuit disposed on a motherboard within the first body 210 and is configured to receive a command to control the first torsion adjusting assembly 242 and the second torsion adjusting assembly 252, so that the first hinge structure 240 and the second hinge structure 250 respectively have a first torsion and a second torsion. In the present embodiment, the first torsion and the second torsion may become different from each other through an adjustment of the control unit 260. The control unit 260 is, for example, adjusts the first torsion according to an included angle between the first body 210 and the connection board 230, and adjusts the second torsion according to an included angle between the second body 220 and the connection board 230.

Specifically, when the included angle between the first body 210 and the connection board 230 is smaller than a specific angle (as the closed state shown in FIG. 7), the control unit 260 controls the second torsion to be larger than the first torsion. Now, since the second hinge structure 250 has the larger second torsion, the user may open the second body 220 from the first body 210 under a situation of not rotating the second body 220 in relative to the connection board 230. When the included angle between the first body 210 and the connection board 230 is greater than the specific angle (as the open state shown in FIG. 8), the control unit 260 increases the first torsion and reduces the second torsion, so as to adjust the second torsion to be smaller than the first torsion and enable the user to easily rotate the second body 220 in relative to the connection board 230, thereby adjusting the angle and position of the second body 220 according to the demand. The aforementioned specific angle may be set as any adaptive angle, and the invention is not limited thereto.

As shown in FIG. 8, in the present embodiment, the second body 220 includes a display screen 222. The display screen 222 may display a control button 222a. When the control button 222a is being pressed, the first torsion and the second torsion are lowered through adjustments of the control unit 260. In this way, when wishes to adjust rotational angle of the second body 220 and connection board 230, the user may press the control button 222a on the display screen 222 to reduce the first torsion and the second torsion so as to allow the second body 220 and the connection board 230 to rotate easily. When the adjustment allowing the first torsion and the second torsion to increase is finished, the user may stop pressing the control button 222a, so that second body 220 and the connection board 230 are being fixed.

In summary, the electronic device of the invention has a torsion adjusting assembly. The torsion adjusting assembly may be moved to the first position to enable the first connecting component and the torsion adjusting assembly to separate from each other, or moved to the second position to enable the first connecting component to connect to torsion adjusting assembly. When the first connecting component and the torsion adjusting assembly are separated from each other, the hinge structure has the smaller first torsion, so that the user may smoothly open the first body from the second body or close the first body to the second body. When the first connecting component is connected to the torsion adjusting assembly, the hinge structure has the larger second torsion so as to avoid the first body from being shaken due to the touch control operation of the use. As such, the operation and control of the electronic device may be improved. In the process of operating the electronic device, the user, depending on the use demand, may adjust the torsions of the hinge structure via the control unit at the adaptive timings, and thus, the torsion adjustment flexibility and adaptability of the hinge structure may be enhanced. In addition, the control unit may automatically adjust the torsions of the hinge structure according to whether the displacement is produced by the first body and whether the touch input signal is received by the touch display panel, so as to enhance the operational convenience of the electronic device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
   a first body;
   a second body;
   a hinge structure, comprising:
      a first pivot component, fixed on the first body;
      a second pivot component, fixed on the second body and pivoted to the first pivot component;
      a first connecting component, fixed on the first pivot component; and
      a torsion adjusting assembly, movably disposed at the second body; and
   a control unit, configured to receive a command to control the torsion adjusting assembly to move to a first position or a second position, wherein when the torsion adjusting assembly is moved to the first position, the first connecting component and the torsion adjusting assembly are separated from each other and the hinge structure has a first torsion, and when the torsion adjusting assembly is moved to the second position, the first connecting component is connected to the torsion adjusting assembly and the hinge structure has a second torsion, wherein the second torsion is larger than the first torsion.

2. The electronic device as recited in claim 1, wherein the first torsion is between the first pivot component and the second pivot component.

3. The electronic device as recited in claim 1, wherein the torsion adjusting assembly comprises:
   a moving component, movably disposed at the second body; and
   a second connecting component, pivoted to the moving component, wherein the second torsion is between the moving component and the second connecting component, when the moving component is moved to the first position, the first connecting component and the second connecting component are separated from each other, and when the moving component is moved to the second position, the first connecting component is connected to the second connecting component.

4. The electronic device as recited in claim 3, wherein the first connecting component and the second connecting component are gears, and when the second connecting component is moved to the second position, the first connecting component is engaged with the second connecting component.

5. The electronic device as recited in claim 1 further comprising an actuating unit, wherein the actuating unit comprises:
- a coil, fixed on the second body; and
- a magnetic component, fixed on the torsion adjusting assembly, wherein the control unit is adapted to control the coil to be energized to generate a magnetic field so as to drive the magnetic component to move and drive the torsion adjusting assembly to move to the first position or the second position.

6. The electronic device as recited in claim 1 further comprising at least one displacement sensing unit, wherein the displacement sensing unit is coupled to the control unit, and when the displacement sensing unit senses a displacement produced by the first body, the control unit controls the torsion adjusting assembly to be located at the first position.

7. The electronic device as recited in claim 6, wherein a quantity of the at least one displacement sensing unit is two, the two displacement sensing units are respectively disposed at the first body and the second body, and when the two displacement sensing units sense relative displacements produced by the first body and the second body, the control unit controls the torsion adjusting assembly to be located at the first position.

8. The electronic device as recited in claim 6, wherein the displacement sensing unit comprises at least one of an accelerometer, a magnetometer or a gyroscope.

9. The electronic device as recited in claim 6, wherein the first body has a touch display panel, the touch display panel is coupled to the control unit, and when the touch display panel receives a touch input signal and the displacement sensing unit senses no displacement produced by the first body, the control unit controls the torsion adjusting assembly to be located at the second position.

10. The electronic device as recited in claim 6, wherein the first body has a touch display panel, the touch display panel is coupled to the control unit, and when the touch display panel receives a touch input signal and the displacement sensing unit senses a displacement produced by the first body, the control unit controls the torsion adjusting assembly to be located at the first position.

* * * * *